United States Patent [19]

Mount

[11] Patent Number: 4,557,182
[45] Date of Patent: Dec. 10, 1985

[54] EXPANSION CHAMBER DEVICES

[76] Inventor: Wilbur S. Mount, 90 Whistler Way, Box 946, E. Falmouth, Mass. 02536

[21] Appl. No.: 618,198

[22] Filed: Jun. 7, 1984

[51] Int. Cl.⁴ .............................................. F16J 3/00
[52] U.S. Cl. ...................................... 92/90; 92/98 R
[58] Field of Search ................ 92/90, 89, 96, 94, 98 R

[56] References Cited

U.S. PATENT DOCUMENTS

| | | | |
|---|---|---|---|
| 1,944,575 | 1/1934 | Rockwell | 92/94 |
| 2,452,176 | 10/1948 | Bent | 267/1 |
| 3,051,143 | 8/1962 | Nee | 121/48 |
| 3,137,214 | 6/1964 | Feld et al. | 92/90 |
| 3,379,411 | 4/1968 | Vanderjagt | 254/93 |
| 3,495,502 | 2/1970 | Buosso | 92/39 |
| 3,784,255 | 1/1974 | Smock | 298/8 |
| 4,292,887 | 10/1981 | Ohta et al. | 92/94 |

FOREIGN PATENT DOCUMENTS 2751430  5/1979  Fed. Rep. of Germany .......... 15/10

Primary Examiner—Robert E. Garrett
Assistant Examiner—Richard S. Meyer

[57] ABSTRACT

An expansion device for converting changes in fluid pressure to displacement of a moving machine part or converting displacement of a moving part to changes in fluid pressure, the device featuring a first flexible expansion chamber wall at least partially defining a first expansion chamber region, a first rigid member having a convex surface supporting the chamber wall, a second rigid member having a concave surface facing the convex surface and movably mounted relative to the first rigid member to cause, when the first and second rigid members move together, the wall to fold over so that a portion of the wall's inner surface changes from an expanded concave shape to a convex shape adjacent to the first member, and a displacement connector attached to one of the first and second rigid members for connection to a moving machine part.

9 Claims, 6 Drawing Figures

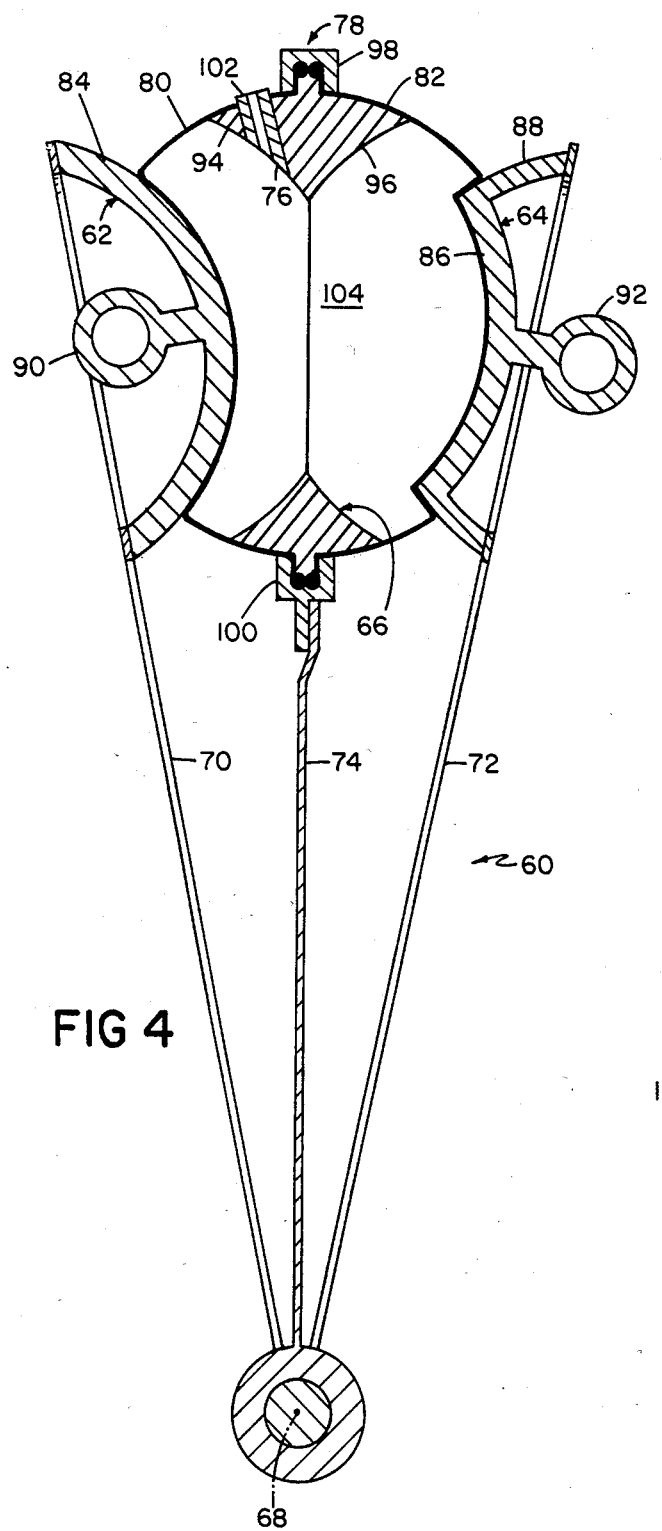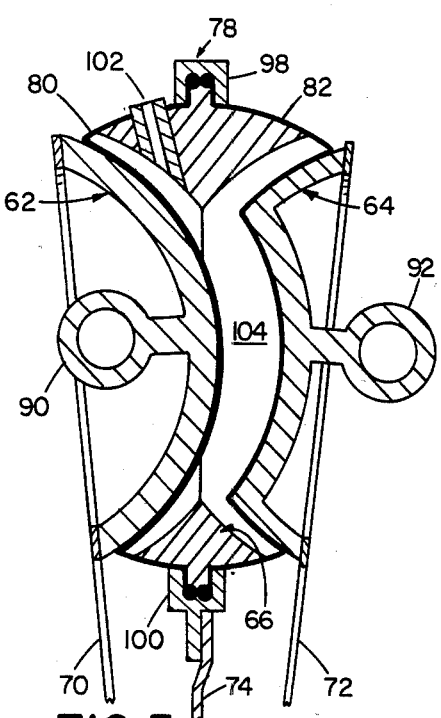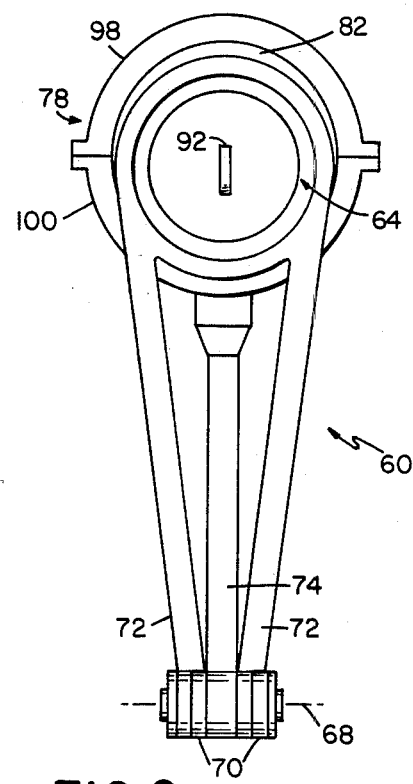

EXPANSION CHAMBER DEVICES

FIELD OF THE INVENTION

The invention relates to expansion chamber devices.

BACKGROUND OF THE INVENTION

Expansion chamber devices are often used to convert changes in fluid pressure to mechanical displacement of a machine part and vice versa in, e.g., actuators, pumps, motors, shock absorbers, springs, measuring instruments, controllers and sensors.

Bousso U.S. Pat. No. 3,495,502, Vanderjagt U.S. Pat. No. 3,379,411 and Smock U.S. Pat. No. 3,784,255 disclose rotary motion or pivoting expansion devices with multiple chambers provided by flexible walls and connected in series. Bent U.S. Pat. No. 2,452,176 discloses a linear motion expansion device with a rubber wall of an expansion chamber deflected between rigid members of matching curvature.

SUMMARY OF THE INVENTION

In general the invention features an expansion chamber device having a flexible expansion chamber wall supported between a first rigid member having a convex surface and a second rigid member that is pivotally mounted relative to the first rigid member and has a facing concave surface. As the rigid members move toward each other, the flexible wall folds over so that a portion of its inner surface changes from an expanded concave shape spaced from the first member to a contracted convex shape adjacent to the first member, and the expansion chamber region reduces in volume.

In the preferred embodiments the surfaces of the rigid members form portions of spheres; the flexible expansion chamber walls are secured to the rigid members by bonding (e.g., by adhesive) or by clamping the edges of the wall to a rigid member. In some preferred embodiments the axis of rotation passes very close to an edge of the expansion chamber region to permit large angular displacements; and a shell is provided to enclose a vacuum region through which the first rigid member moves. In other preferred embodiments there are two flexible expansion chamber walls connected by a ring and an additional rigid member that mates with both the first and second rigid members.

DESCRIPTION OF THE PREFERRED EMBODIMENTS

The structure and operation of the preferred embodiments of the invention will now be described after first briefly describing the drawings.

Drawings

FIG. 4 is a vertical sectional view of another embodiment of a pivotal motion expansion device according to the invention in one operative position.

FIG. 5 is a partial vertical sectional view of the FIG. 4 device in another operative position.

FIG. 6 is a side view of the FIG. 4 device, reduced in scale from FIGS. 5 and 6.

STRUCTURE

Figure 1:
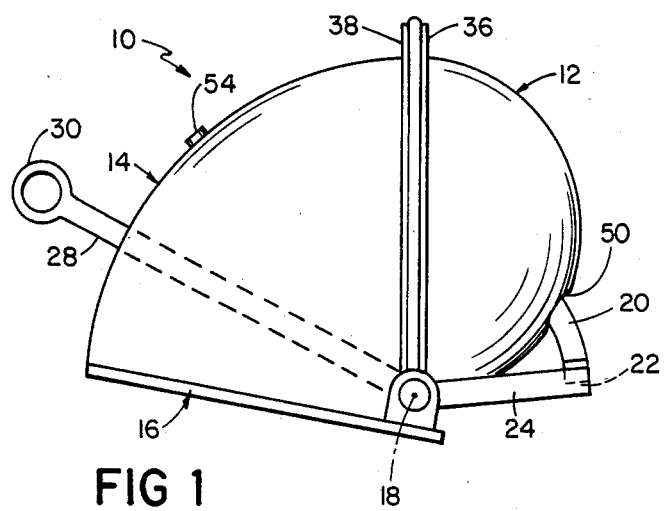
FIG. 1 is a side view of a vacuum actuated, pivotal motion expansion device according to the invention.
Figure 2:
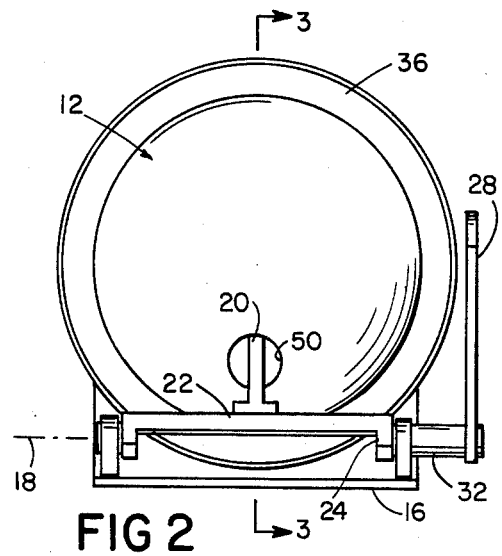
FIG. 2 is an end view of the FIG. 1 device.
Figure 3:
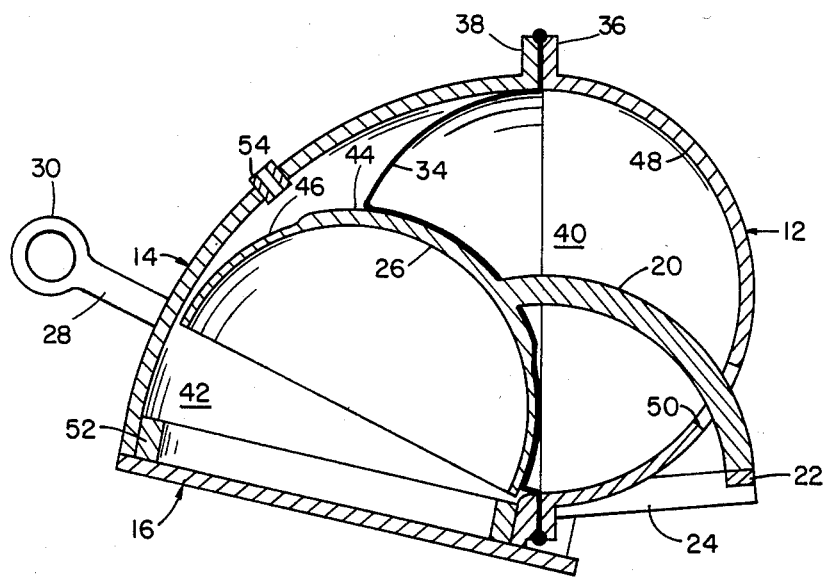
FIG. 3 is a vertical sectional view, taken at 3—3 of FIG. 2, of the FIG. 1 device.

Referring to FIGS. 1–3, there is shown vacuum actuated, pivotal motion expansion device 10 employing fixed hemispherical rigid member 12 sealably connected to outer shell 14 and base 16. Movable hemispherical rigid member 26 is mounted for pivoting about axis 18 via arc-shaped connector 20, horizontal connectors 22 and radial connectors 24. Lever arm 28 has displacement connector 30 for attaching to a moving machine part and is connected through horizontal member 32 to radial connector 24. Hemispherical flexible expansion chamber wall 34 (0.020" thick neoprene elastomer reinforced with nylon fabric embedded in the elastomer) is sealed at its perimeter between annular flanges 36, 38 of rigid member 12 and shell 14 to define expansion chamber 40 with rigid member 12 on one side and vacuum chamber 42 with shell 14 and base 16 on the other side.

Central area 44 of the convex surface of rigid member 26 has a radius of curvature that is less than that of flexible chamber wall 34 by at least the thickness of flexible wall 34; outside of this in outer area 46 of the convex surface, the radius of curvature is less than that of flexible wall 34 by three times the thickness of wall 34, to facilitate folding over of wall 34 in the areas where there is a more acute angle between folding portions of wall 34. Concave surface 48 of rigid member 20 has a radius of curvature that is the same as that of the outside of flexible wall 34. Arc-shaped connector 20 passes through hole 50 in rigid member 12. Cylindrical stop 52 is attached to base 16. Port 54 is provided through shell 14.

"Rigid" herein means that the flexible wall deforms when it is acted upon by a rigid member. Rigid members 12 and 26 have diameters of approximately five inches. These parts, shell 14, base 16 and other parts are made of metal or molded polycarbonate. Flexible chamber wall 34, has a hole through which arc-shaped connector 20 passes and is adhered to member 26 near connector 20 by adhesive, heat fusion, or other means.

Referring to FIGS. 4–6 there is shown pivotal motion expansion device 60 including outer rigid members 62, 64 and inner ring member 66, all pivotally connected about axis 68 via pivot arms 70, 72, 74. Sealably connected between ring member 66 and outer clamp 78 are hemispherical flexible walls 80, 82 (made of the same material as wall 34). Hemispherical wall 80 is supported by convex surface 84 of rigid member 62, and hemispherical flexible wall 82 is supported by concave surface 86 and convex surface 88 of rigid member 64. Rigid member 62 has displacement connector 90, and rigid member 64 has displacement connector 92. Convex surface 84 is shaped to mate with flexible wall 80 and concave surface 94 of ring 76. To facilitate foldover of wall 80, the radius of curvature of convex surface 84 is made less than the interior curvature of flexible wall 80 by at least the flexible wall thickness. Similarly convex surface 88 is shaped to mate with flexible wall 82 and concave surface 96 of ring 76. To facilitate foldover of wall 82, the radius of curvature of convex surface 88 is made less than the interior curvature of flexible wall 82 by at least the flexible wall thickness. Concave surface 86 is similarly shaped to mate with flexible wall 82 and convex surface 84 and flexible wall 80 in its central area, and its radius of curvature is greater than the interior curvature of wall 82 by the thickness of the flexible wall. Referring to FIG. 6 it is seen that arms 70, 72, 74 pivot about shaft 96, and outer clamp 78 is made of two pieces 98, 100 fastened together. Port 102 passes through outer rigid member 62 and flexible wall 80.

OPERATION

In the operation of the FIGS. 1–3 device, displacement connector 30 is connected to a moving machine part, and base 16 is secured to another part of the machine. A decrease in pressure in chamber 42 caused by activation of a vacuum source connected to port 54 causes counterclockwise displacement of rigid member 26, flexible wall 34 rolling off of convex surfaces 44, 46 of rigid member 26, reversing its curvature without harmful stretch or distortion, because the walls are made of flexible material, and the shapes of the flexible walls and the rigid members are almost the same. In FIG. 3, rigid member 26 is shown after having travelled most of the way from its initial position adjacent to rigid member 12 to its final position against stop 52. During pivoting of rigid member 26, lever arm 28 similarly pivots. After deactivation of the vacuum, lever arm 28 and rigid member 26 are returned to their initial positions by, e.g., a spring (not shown), and flexible wall 34 rolls onto convex surfaces 44, 46, reversing its curvature once again. Because pivot axis 18 is near the edge of expansion chamber region 40, large angular displacement is provided. Also, the pivotal connection acts to align the members with a small amount of friction, making the device very sensitive to pressure changes, and without the necessity of sliding guide members or of guide members passing through the expansion chambers as with many linear motion expansion chamber devices.

In operation of the FIGS. 4–6 device, increases in pressure communicated through port 102 to expansion chamber 104 cause rigid members 62, 64 to diverge, flexible walls 80, 82 rolling off of surfaces 84, 88 without stretch or distortion. Rigid members 62, 64 are then brought back together using, e.g., a spring, (not shown). FIG. 5 shows the members near their fully closed positions. An important feature of the FIGS. 4–6 design is that there is complete contraction without an acute folding angle because of ring member 88.

Other Embodiments

Other embodiments in the invention are within the scope of the appended claims. For example, other materials can be used for the flexible expansion chamber walls, and other shapes in addition to spherical shapes can be used. Different materials such as other plastics or metals could be used for the rigid members. Also, instead of converting changes in fluid pressure to displacement of a moving machine part, the devices could be used to convert displacement of a machine part to changes in fluid pressure.

What is claimed is:

1. An expansion device for converting changes in fluid pressure to displacement of a moving machine part or converting displacement of a moving part to changes in fluid pressure, said device comprising
a first flexible expansion chamber wall at least partially defining a first expansion chamber region on one side of it,
said wall being curved and having an inner surface,
a first rigid member having a convex surface supporting said chamber wall,
said wall and said convex surface having almost the same shape,
a second rigid member having a first concave surface facing said convex surface, and being connected around its periphery to said first flexible wall,
means for mounting said first rigid member for pivotal movement toward and away from said second rigid member about an axis to cause, when said first and second rigid members move toward each other, said wall to fold over so that a portion of said wall's inner surface changes from an expanded concave shape spaced from said first member to a contracted convex shape adjacent to said first member, said wall reversing its curvature without harmful stretch or distortion, and
said flexible wall being substantially spaced from said first concave surface of said second rigid member when said first rigid member is spaced from said second rigid member in an expanded position, said flexible wall being moved toward said concave surface to said second rigid member and said first rigid member is moved toward said second rigid member,
a first displacement connector attached to one of said rigid members.

2. The device of claim 1 wherein said first rigid member convex surface and said flexible wall form portions of spheres.

3. The device of claim 1 wherein said axis passes nearby an edge of said expansion region to permit large angular displacements.

4. The device of claim 1 further comprising means for defining a vacuum chamber region in which said first rigid member moves on the other side of said flexible expansion chamber wall from said expansion chamber region, and wherein said displacement connector is connected to said first rigid member, whereby a vacuum source can be applied to said vacuum chamber to cause said first rigid member to be displaced.

5. The device of claim 4 wherein said means for defining a vacuum chamber region comprises a base member and a shell having a circular opening sealed to said flexible chamber wall and said second rigid member.

6. The device of claim 5 wherein said displacement connector is connected to said first rigid member by an arc-shaped connector passing through a hole in said second rigid member.

7. The device of claim 1 wherein said second rigid member has a hole passing through it, and further comprising a second flexible expansion chamber wall on the other side of said second rigid member from said first rigid member and a third rigid member that is pivotally connected to said second rigid member, supports said second flexible wall, and has a central concave surface for mating with a portion of a said first flexible wall supported on said first rigid member when said portion passes through said opening.

8. The device of claim 7 wherein said second rigid member has a second concave surface on the side of said second member facing said third rigid member, and wherein said third rigid member has an outer convex surface for mating with said second concave surface.

9. The device of claim 7 further comprising arms connecting said first, second, and third rigid members to a pivotal connection about a common axis.

* * * * *

UNITED STATES PATENT AND TRADEMARK OFFICE
CERTIFICATE OF CORRECTION

PATENT NO. : 4,557,182

DATED : December 10, 1985

INVENTOR(S) : Wilbur S. Mount

It is certified that error appears in the above-identified patent and that said Letters Patent are hereby corrected as shown below:

Column 4, line 21, "to" should be --of--.

Column 4, line 21, "and" should be --as--.

Signed and Sealed this

Fifteenth Day of April 1986

[SEAL]

Attest:

DONALD J. QUIGG

Attesting Officer

Commissioner of Patents and Trademarks